Feb. 9, 1932.    W. P. KENNEDY    1,844,510
MOTOR VEHICLE
Filed June 17, 1925    2 Sheets-Sheet 2
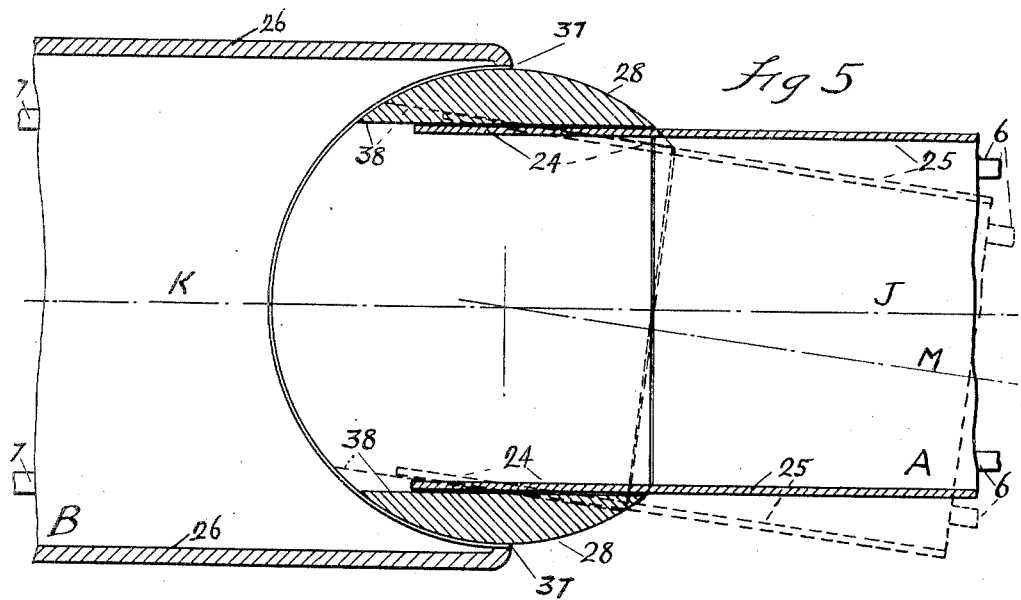
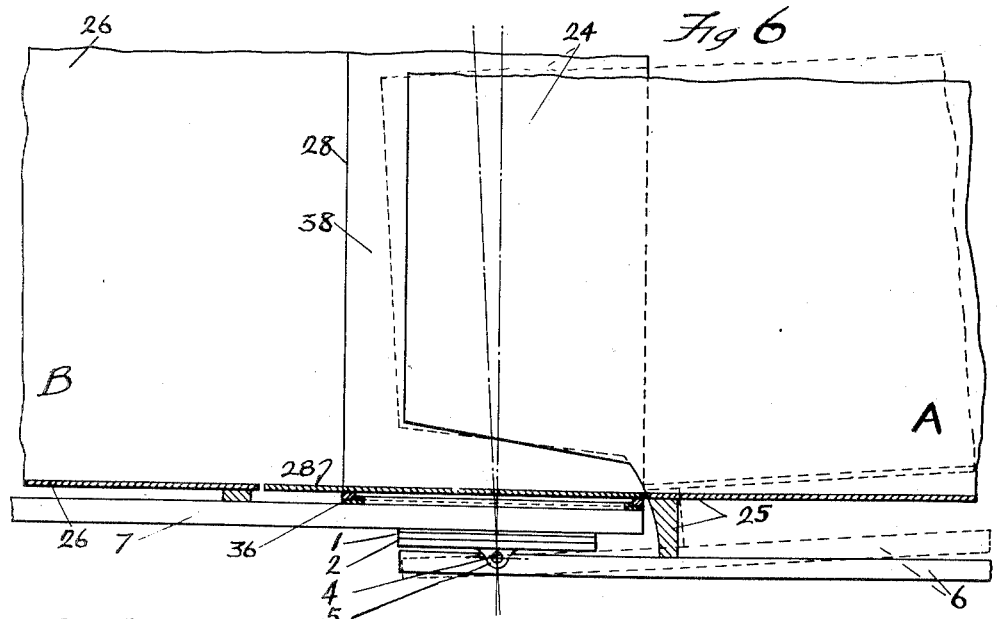
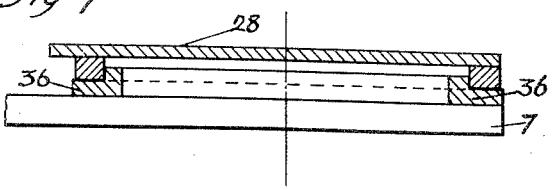
INVENTOR
William P. Kennedy.

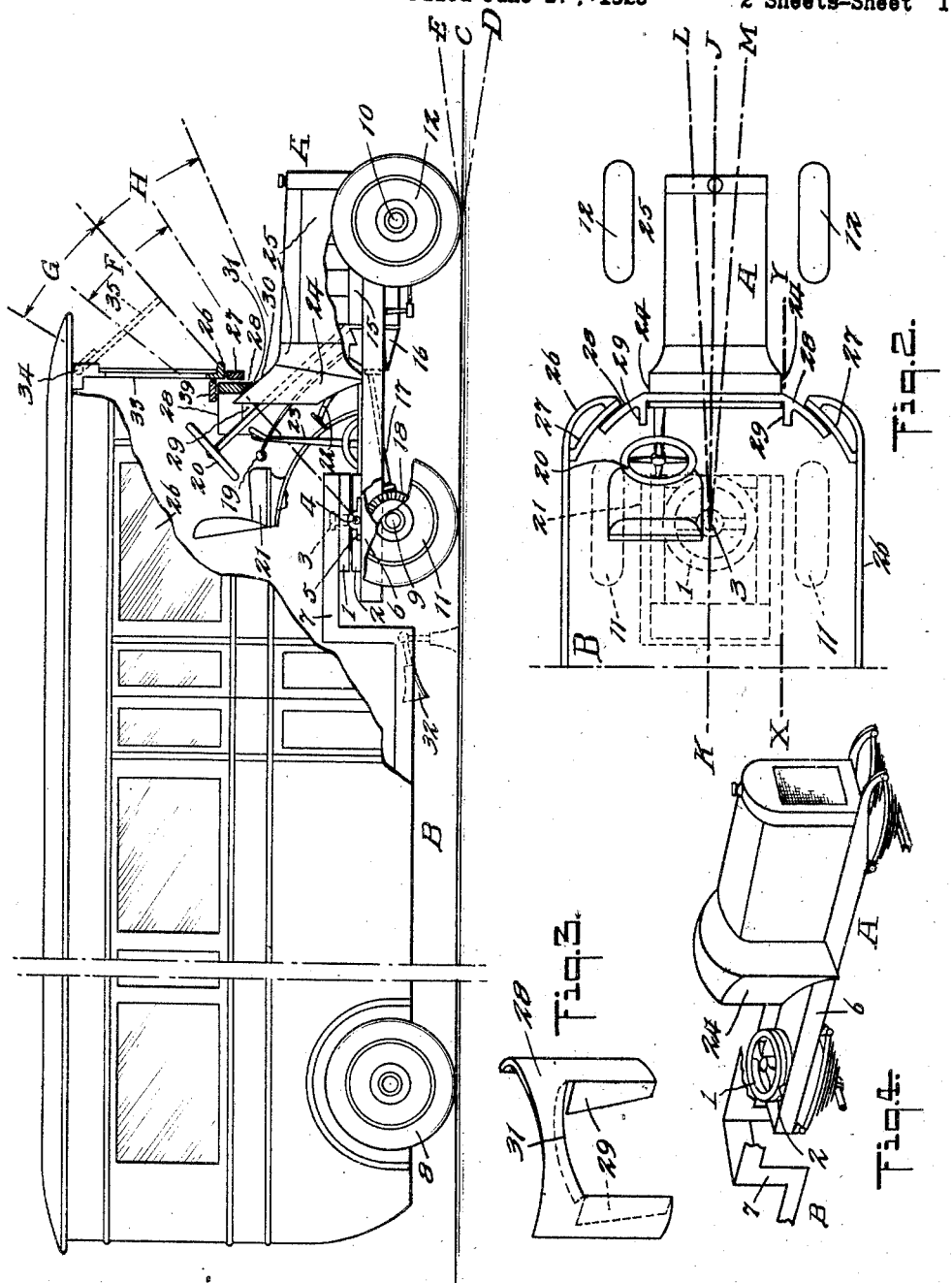

Patented Feb. 9, 1932

1,844,510

UNITED STATES PATENT OFFICE

WILLIAM P. KENNEDY, OF NEW YORK, N. Y.

MOTOR VEHICLE

Application filed June 17, 1925. Serial No. 37,713.

This invention covers an improvement in the body construction in vehicles of the tractor and trailer type tending to unite the tractor and trailer in a unit vehicle. The principal body structure being located on the trailer is made to inclose the rear part of the tractor body and to include within this inclosure the driver together with his operating control mechanism, the driver to be thus directly in contact with passengers when such construction is embodied in motor bus vehicles, or in direct contact with the load carried when the vehicle used is for the transportation of merchandise.

The objects of this invention when applied to a motor vehicle having two or more sections combined to form an operating unit, particularly exemplified in tractor and semi-trailer vehicles, include the following: A body construction which is mainly located on the semi-trailer provided with associated minor auxiliary parts which are located on the tractor arranged to move in relation to one another in coordination with the movement between the tractor and the semi-trailer running gear parts, so as to form an inclosure within which is located the load carried and the operator of the vehicle with provision for maintaining closure where the movable parts of the body adjoin each other. A unit vehicle in which some of the body parts are located on the tractor to cooperate, in forming the body inclosure as a whole, with the main body structure located on the semi-trailer in such a manner that the tractor may be readily withdrawn from the semi-trailer body part and other tractors of the same or different power capacity substituted to provide for varying transportation requirements; or, conversely, that the trailer body structure may be detached from the tractor and other trailer bodies of the same or different capacities substituted for intermittent use with the tractor to meet varying transportation requirements. To provide in such a form of construction for the ready interchange of spare tractors of similar capacity to facilitate repair and maintenance of power plants and driving equipment located on the tractor without interruption to a continuous service of the vehicle as a whole.

In existing practice in the use of tractor and trailer vehicles, it is customary to have the operator seated upon the tractor in a separate cab or compartment and thus he is entirely detached from any body inclosure which may be employed to contain the load carried on the trailer. Tractor and trailer types of vehicles are generally used for merchandise transportation. In some few instances this form of vehicle has been employed for passenger transportation, but in each of these instances the operator is not located within the inclosure provided for the accommodation of the passengers. This has been due principally to the detachment which has existed between the tractor and trailer elements of such vehicles, each element being maintained free and independent of the other and no endeavor made to so combine these elements so as to utilize them in a unit form of vehicle for which there would be a common body while permitting freedom of relative movement between the running gears or chassis of the tractor and the trailer.

The invention herein described provides for the utilization of this form of vehicle as a unit in such a manner as to have the driver and control mechanism located within a single and complete body inclosure having direct access to the load carried, whether merchandise or passengers, and thus in the latter case render his services useful for the collection of fares or other such duties as usually require the presence of a conductor for these secondary purposes. While it will, therefore, be understood that this invention relates to tractor and trailer vehicles employed for either passenger or merchandise transportation, for illustrative purposes the following description and the attached drawings are based upon the application of this invention to a motor bus employed for passenger transportation service.

In the present development of the application of motor vehicles for mass transportation in city service and for interurban passenger transportation over rural highways the tendency is to increase the number of passengers carried to the ultimate capacity of the currently produced units of power plant and running gear equipment. This demand for increased carrying capacity has given rise to a departure from the conventional forms of four wheel vehicles and a logical step in consequence is the employment of six wheel vehicles in which the additional axle and wheels is made to carry a proportion of the load.

There are certain superior advantages in the use of tractor and semi-trailer types of vehicles, such as equal distribution of the working load carried on two axles, braking equipment on the four wheels of these two axles, flexibility of suspension and the interchangeability of power plants and bodies of various capacities. All of these features become available, particularly to passenger transportation, when employed in vehicles incorporating the unit body construction provided by this invention.

The best known embodiment of my invention is shown in the accompanying drawings, in which:

Fig. 1 is an elevation or side view of a tractor and semi-trailer comprising a motor bus vehicle partly in section taken along the line X—Y of Fig. 2 and partly diagrammatic to illustrate the connections between the tractor and semi-trailer and the interrelation of the respective body parts mounted on the tractor and semi-trailer.

Fig. 2 is a plan view of the forward part of the tractor and semi-trailer shown in Fig. 1, partly diagrammatic to indicate the connections between the tractor and semi-trailer, and the interrelations of the body parts mounted thereon.

Fig. 3 is a perspective illustration of a movable body part located between the forward part of the body mounted on trailer and the minor body parts mounted on the tractor, which movable part is partially rotated within the trailer body inclosure by the tractor when relative movement takes place between the tractor and the trailer.

Fig. 4 shows in perspective the cowl of the tractor to indicate its interrelation to the movable body member just described under Fig. 3.

Fig. 5 is a plan view diagrammatically illustrating the means employed for the horizontal rotation of a movable body member interposed between the tractor body parts and the body mounted on trailer.

Fig. 6 is a vertical diagrammatic illustration indicating the relative movement of the tractor body parts in a vertical direction with reference to the body mounted on the trailer, and the separate body member interposed between the body parts on tractor and the body on the trailer.

Fig. 7 is a vertical section showing the mounting of the rotating body part indicated in Figs. 5 and 6 providing for its movement when relative motion takes place between the tractor and the trailer.

Similar numerals refer to similar parts throughout the several views.

As illustrated, in Fig. 1, A is a tractor, B is a semi-trailer joined together by fifth wheel mechanism consisting of a top ring 1, base plate 2, king bolt 3, rockshaft 4 mounted on brackets 5, so that ring 1 can swivel upon base plate 2 around the vertical axis of king bolt 3 and ring 1 and plate 2 together can rotate around the horizontal axis of rockshaft 4. This fifth wheel mechanism is supported on chassis frame 6 through brackets 5 and in turn by attachment to its top ring 1 supports the forward end of chassis frame 7 of trailer B, the rear end of trailer B being supported by the rear wheels 8. By means of the fifth wheel described the tractor A and the trailer B may move with relation to each other in a horizontal or a vertical direction. As the king bolt 3 passing through the center of top ring 1 and base plate 2 is the means of uniting these together, the removal of this king bolt 3 permits the detachment of the tractor A from the trailer B whenever this becomes desirable.

Tractor A is supported on axles 9 and 10 and driving wheels 11 and steering wheels 12, and within the tractor frame 6 is mounted motor 15 and change gear mechanism 16 having driving connections 17 and 18. 19 is a lever for control of the change gear mechanism 16, and 20 is a steering handwheel and post through which the steering wheels 12 are controlled by an operator located on seat 21. 22 is a clutch pedal connected in the usual manner so that the operator located on seat 21 may connect and disconnect engine 15 to driving shaft 17. 23 is a brake lever adjacent to the driver's seat 21 having the usual mechanical connections to a brake mechanism mounted on driving wheels 11. 24 is a body part mounted on the tractor A which serves as a cowl attached to the rear end of hood 25 to form a body connection between the tractor A and the body 26 mounted on trailer B.

In Fig. 2 the plan view of body 26 shows an opening at its forward end and adjacent to this opening is a cylindrical frame or lining 27, the circular arc of which has its center at the axis of king bolt 3 and is mounted vertically within the forward corners of the body 26 extending from the bottom of the body 26 upward to a height slightly above the top of the cowl 24 as indicated at 27 in Fig. 1. 28 (shown detached in perspective view, Fig. 3) is a floating body member cylindrical in form coinciding with the stationary structure lining 27, within which it is free to partially rotate and having an opening into which fits the cowl 24, the sides of this opening having flanged projections 29 extending inward to coincide with the flat sides of the cowl 24 so that the cowl 24 is free to move radially up and down within the faces of these flanges 29, and whenever the axis of the tractor A changes its angularity with the axis of the trailer B in a horizontal direction, these flanges 29 in contact with the sides of the cowl 24 provide a means by which the floating member 28 may be partially rotated within the structural lining 27 of the body 26, the cylindrical dimensions of floating member 28 being such as to maintain closure in the forward opening of the body 26 within the limits of the horizontal angular movements which take place between the tractor A and trailer B incidental to the steering of the vehicle as a whole. The contour of the arc 30 as shown in Fig. 1 is a circular arc the center of which is the horizontal axis of the rockshaft 4, so that when vertical movement takes place between the tractor A and the trailer B the movement of the top surface of the cowl 24 in passing within the body 26 through the opening of the floating body member 28 will move along such a circular arc and consequently the cross section in the top of the opening in floating body member 28 in a fore and aft direction will be similar in contour to the arc 30 of the cowl 24 as shown at 31 in Fig. 1. The contour of the top of this opening taken in a transverse direction across the vehicle may be a straight line or preferably arched as shown at 31 in Fig. 3 to conform in general with the contour of the rear part of the hood 25 taken transversely across this hood 25 in the vicinity of the cowl 24.

It will thus be seen that if the forward end of tractor A is raised from the level plane C to the inclined plane E or lowered to the inclined plane D, while the trailer B remains horizontal, the arc 30 of the cowl 24 will move through the arc 31 in the opening of floating body member 28 from the position indicated by F to the positions indicated by G or H respectively, maintaining a closure in a vertical direction between the cowl 24 and the floating body member 28. 39 is a circular ledge attached within body 26, beneath which member 28 is free to rotate horizontally.

If, as shown in Fig. 2, the tractor A changes its axis J with relation to the axis K of the trailer B to the horizontal angular positions shown at L or M, the tractor A through the flat sides of the cowl 24 in contact with the flanges 29 of the floating body member 28 will rotate this member 28 horizontally within the cylindrical lining 27 to a corresponding degree in either direction, maintaining by this means closure in the forward opening of the body 26 during movement through these horizontal angular changes. Both of the vertical and horizontal movements herein described can take place separately or simultaneously, thus maintaining a continuous inclosure within the body 26 under the usual movements occuring in vehicular transportation service.

When it is required to detach the tractor A from the semi-trailer B the jack 32 attached to the frame 7 of trailer B is dropped under this frame 7 to a vertical position, and the frame 7 carrying the fifth wheel top ring 1, upon removal of the king bolt 3, is raised sufficiently above the base plate 2 to provide for disengagement. The forward window frame 33 of the body 26 being hinged at 34 is moved forward to the position shown at 35. The floating body member 28 is then raised vertically and thus the tractor A will be free and clear of any engagement for withdrawal from the trailer B.

Fig. 3 is a perspective outline illustration showing in detached form the movable or floating body member 28 and to afford a better view of the flat sides and upper contour of the cowl 24 as shown in Fig. 4 when detached from the body 26.

For further descriptive purposes Figs. 5 and 6 will serve to illustrate in principle and in simplified form the underlying method of connection between the tractor A and trailer B body parts described above in relation to Figs. 1 and 2. Fig. 5 is a horizontal view and Fig. 6 a vertical view in which a cylindrical floating body member 28 capable of being rotated horizontally is introduced between the cowl 24 mounted on the tractor frame 6 and the body 26 mounted on the trailer frame 7, which frames 6 and 7 are connected together for relative movement by the fifth wheel mechanism 1, 2, 3, 4 and 5.

Fig. 7 is introduced to indicate in cross sectional view a suitable mounting for the rotation of floating body member 28 mounted upon a flanged ring 36 placed upon the trailer frame 7 as shown in position above the fifth wheel mechanism in Fig. 5.

The floating body member 28 is cylindrical in outer form and so mounted, as shown in Figs. 5 and 6, that its outer contour is in contact at 37 as shown in Fig. 5 with the forward opening in the body 26 in such a manner that during partial rotation of this cylindrical member 28 it will maintain contact between its outer contour and the body 26 at the points of contact 37. Sectionally through the center of this cylindrical member 28 is a rectangular opening having flat sides at 38 and into which opening is inserted the cowl member 24 the flat sides of which are in contact with the flat sides 38 of this opening. This assembly provides for vertical movement of the cowl 24 within the central opening of the floating body member 28, which vertical movement is indicated in the dotted lines of Fig. 6. This assembly also provides for the horizontal rotation of the member 28 within body 26 as shown in the dotted lines of Fig. 5 whenever the axis J of the tractor A changes its angular relation to the axis K of trailer B as shown at M. Then the horizontal rotary movement of the member 28 is effected by the changing position of the cooperating parts as indicated in dotted lines in this Fig. 5.

What I claim and desire to secure by Letters Patent is:

1. In a highway motor vehicle, a tractor having propulsion and steering equipment and an operator's seat and control mechanism mounted thereon in combination with a semi-trailer flexibly coupled thereto, a body mounted on said trailer extending over that part of the tractor containing said operator's seat and control mechanism and body parts on tractor arranged to maintain contact and closure with trailer body during relative movement of tractor and trailer.

2. In a motor vehicle comprising a dirigible tractor and a semi-trailer flexibly coupled thereto providing for angular movement of one relative to the other, a body part mounted on said tractor adjacent to a body part mounted on said semi-trailer and a movable body member interposed between these adjacent body parts arranged to be moved by relative angular movement between said tractor and said semi-trailer.

In testimony whereof, I have signed my name to this application, this 15th day of June, 1925.

WILLIAM P. KENNEDY.